April 7, 1942.     R. MODLINGER     2,279,053
ELECTRIC MEASURING INSTRUMENT
Filed Oct. 21, 1938
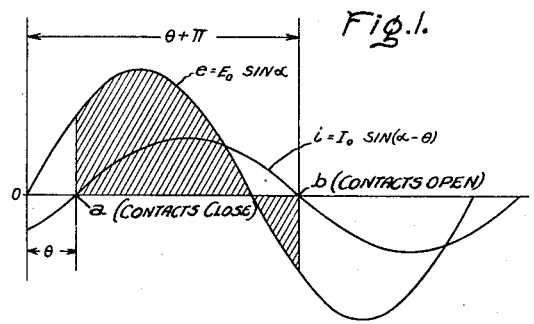
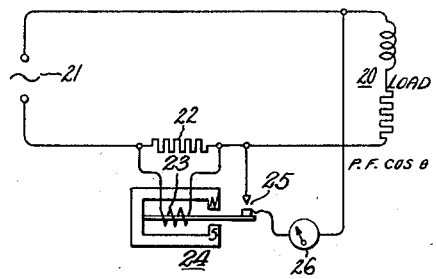
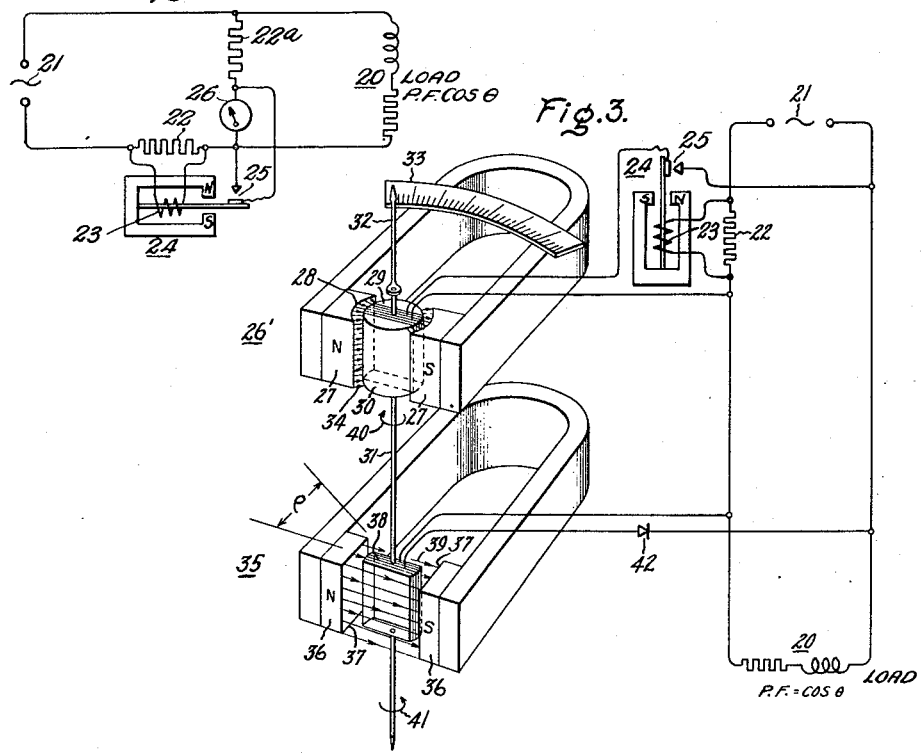
Inventor:
Richard Modlinger,
by Harry E. Dunham
His Attorney.

Patented Apr. 7, 1942

2,279,053

UNITED STATES PATENT OFFICE

2,279,053

ELECTRIC MEASURING INSTRUMENT

Richard Modlinger, Berlin, Germany, assignor to General Electric Company, a corporation of New York Application October 21, 1938, Serial No. 236,358
In Germany October 22, 1937

7 Claims. (Cl. 172—245)

This invention relates to instruments for indicating and measuring alternating current quantities and particularly alternating current quantities such as phase displacement, power-factor, voltage components and the like.

It is an object of the invention to provide an improved device for measuring phase angles of alternating current voltages or currents.

Another object of the invention is the employment of apparatus including a permanent magnet moving-coil type electric instrument by means of which the phase angle between two electrical quantities may be read directly in degrees.

Another object of the invention is the provision of such an instrument which is adapted to measure the power-factor of an alternating current load.

Still another object of the invention is the employment of such an instrument for measuring the in-phase component of the voltage in an alternating current circuit.

A further object of the invention is the provision of an electric meter for indicating and measuring phase displacement and power-factor of alternating current quantities which is independent of voltage fluctuations.

Other and further objects and advantages of the invention will become apparent as the description proceeds.

In carrying my invention into effect, I connect an electric meter across the circuit being investigated, the meter being of the d'Arsonval galvanometer type which is capable of responding to only average values of voltage or current applied to its terminals. Means are provided for periodically deenergizing or removing the meter from the circuit for a predetermined period of time during each cycle of the current at a point in the voltage wave determined by the phase displacement between the current and voltage. I have discovered that the average value of the portion of the voltage wave measured for such predetermined time is a function of the power-factor of the circuit and that a meter adapted to respond correctly in proportion to this average value may be calibrated to read the power-factor on a uniform scale or phase displacement between the current and voltage on a non-uniform scale and, under certain conditions, the in-phase component of the voltage.

In carrying out my invention in another form I combine two instruments of the deflecting type, following different laws expressing the relationship between the torque and current, by mechanically connecting their moving elements in such a manner that their effects are opposed. For example, I may provide one unit in which the torque is directly proportional to the average value of the current flowing in the meter coil such as a d'Arsonval galvanometer, and a second unit in which the torque is proportional to the product of the average value of the current in the meter coil times the cosine of the angle of rotation of the meter. Such a device makes possible the direct reading of the angle of phase displacement on a uniform scale and is independent of voltage fluctuations.

My invention will be better understood from the following description taken in connection with the accompanying drawing and the features which I believe to be novel and patentable are pointed out in the appended claims.

Referring to the accompanying drawing, Fig. 1 represents typical sine waves of voltage and current, the characteristics of which are being investigated; Fig. 2 illustrates apparatus for measuring the power-factor or phase angle of a given load when a constant voltage is applied to the meter or which may be calibrated to measure the in-phase component of voltage when connected to a variable voltage circuit; Fig. 2A is a modification of Fig. 2; and Fig. 3 illustrates a modified form of apparatus for giving a correct measurement and indication of the power-factor or phase angle between two electrical quantities regardless of voltage fluctuations.

In Fig. 1 a voltage wave is shown following the equation $e = E_0 \sin \alpha$, where $e$ is the instantaneous value of the voltage and $E_0$ is the maximum value. The current wave having an instantaneous value $i$ is shown lagging the voltage by an angle of $\theta$ degrees. For purposes of illustration, assume that a meter which responds to average values is connected in circuit across the voltage $e = E_0 \sin \alpha$ at the instant $a$ where the current wave passes through zero in a positive direction and that the meter is deenergized or removed from the circuit at the instant $b$ after the current wave has completed one-half cycle. For a given angular phase displacement of $\theta$ degrees, there will be a corresponding reading on the meter which is proportional to the average value of the voltage measured during the time interval or period $ab$. This average value ($E_{ab}$) is equal to the area of the cross-hatched portion of the voltage wave shown in Fig. 1, divided by its base and may be stated as $$E_{ab} = \frac{1}{\pi} \int_{\theta}^{\theta+\pi} E_0 \sin \alpha \, d\alpha = \frac{2E_0}{\pi} \cos \theta$$

or
$$E_{ab} = k\, E \cos \theta \qquad (1)$$

where E is the effective or R. M. S. value of the voltage being investigated. This equation applies only for the case where the contacts are closed and opened at the points $a$ and $b$ respectively, and if the vibrator is adjusted so that its contacts open and close at other points along the current wave a different calibration of the meter is necessary.

Equation 1 thus shows that the average value of the voltage under the above conditions is proportional to the power-factor ($\cos \theta$) of the circuit so long as the R. M. S. value of the circuit voltage remains constant. On the other hand $E \cos \theta$ represents the in-phase component of the voltage and may be useful in measuring the power in an alternating current circuit.

The arrangement shown in Fig. 2 is illustrative of one form of apparatus which I have devised for carrying out my invention. A load 20 having a power-factor ($\cos \theta$) is connected to an alternating current source 21, with a voltage represented by the equation $e = E_0 \sin \alpha$. In the load circuit is placed a series resistor 22 and across this resistor is connected the operating coil 23 of a vibrator or electro-mechanical interrupter 24 having contacts 25. The vibrator armature carrying one of the relatively movable contacts 25 is so adjusted and proportioned that it is caused to oscillate or vibrate periodically in synchronism with the current flowing in the load circuit and, for the case illustrated in Fig. 1, the vibrator is adjusted so that its contacts 25 close periodically at the instant $a$ when the current wave is passing through zero in a positive direction and open periodically at the instant $b$, $\pi$ radians later in time phase, after the current has completed a half cycle and is passing through zero in a negative direction.

The meter 26 is of the conventional d'Arsonval galvanometer type employing element 26', as shown in detail Fig. 3, and a helical spring (not shown) to provide a directional force or counter-torque to the meter shaft. Element 26' includes a permanent magnet 27 having arcuate pole faces 28, and a moving coil 29 wound about a soft iron core 30 mounted for rotation on a shaft 31 which operates a pointer 32 cooperating with a scale 33. The coil 29 is shown connected in series with the contacts 25 across the load 20. Obviously, instead of connecting the contacts 25 in series with the meter coil 29, I may employ a meter circuit including an external resistance and connect the contacts 25 in shunt with the meter coil 29, as illustrated in Fig. 2A. With such an arrangement the contacts 25 would be adjusted to open at $a$ and close at $b$ to operatively connect the meter in the circuit. Inasmuch as the meter 26 is in circuit during the period $ab$, corresponding to 180 electrical degrees or a complete positive or negative half cycle of the current wave, $$i = I_0 \sin (\alpha - \theta) \tag{ }$$

it responds to a voltage having an average value represented by Equation 1 or $E_{ab} = kE \cos \theta$.

By virtue of the permanent magnet 27, the arcuate pole faces 28, and the soft iron core 30, I obtain a radially directed field 34 of constant intensity and of substantially uniform strength in the air gap throughout the angular range of the instrument. With such an arrangement the meter torque is $$T_m = k_2 I_{ab} \tag{2}$$

where $I_{ab}$ is the average value of the current flowing in the meter coil 29. Since the current flowing in the meter coil 29 is proportional to the voltage of the circuit, Equation 2 may be restated as $$T_m = k_3 E_{ab} \tag{3}$$

From Equations 1 and 3 the meter torque $T_m$ may also be represented by the equation $$T_m = k_4 E \cos \theta \tag{4}$$

The helical spring in a meter such as 26 exerts a directional force or counter-torque proportional to the angle of twist or $$T_s = k_5 \rho \tag{5}$$

where $T_s$ is the counter-torque, $\rho$ is the angle of twist, and $k_5$ is the spring constant. For equilibrium conditions the meter torque and the spring torque must balance. Thus $T_s = T_m$. It follows that $k_5 \rho = k_4 E \cos \theta$ or $$\rho = k_6 E \cos \theta \tag{6}$$

From Equation 6 it may be observed that for constant voltage on the circuit the angular deflection of the meter is proportional to the power-factor and this quantity may be read on a uniform scale or, if desired, the angles corresponding to the various power-factors may be read on a non-uniform scale. It may also be observed that the expression $E \cos \theta$ in Equation 6 is the in-phase component of the voltage of the source 21 applied to the circuit. The meter may also be calibrated to read this quantity regardless of fluctuations in voltage.

To provide measuring apparatus which will accurately indicate the power-factor or phase displacement between the current and voltage regardless of fluctuations in voltage of the source 21, I have devised the arrangement disclosed in Fig. 3. I employ an element 26' which is identical to that described in connection with Fig. 2, including the means for energizing and deenergizing the meter coil 29. But in addition, I have provided a second element 35 to replace the helical restraining coil (not shown) used in meter 26 of Fig. 2. Element 35 includes a permanent magnet 36 having plane shaped pole faces 37, and a moving coil 38 mounted for rotation on the shaft 31 with the other coil 29. The coil 38 is connected to the load circuit 20 through a half-wave rectifier 42 of the copper oxide type or the equivalent. A full wave rectifier may be used if desired. The moving coils 29 and 38 are so connected that the torques tending to produce rotation of the pointer operating shaft 31 are in opposition as indicated by the arrows 40 and 41.

In the element 35 the direction of the field 39, the conductor 38, and the direction of the force are no longer mutually perpendicular to one another, as obtains in element 26', due to the rectilinear field 39. With this arrangement, when the coil 38 is turned through an angle $\rho$ about the axis of rotation in the rectilinear field 39 the component or, one may say, the intensity of the field producing torque is no longer constant throughout the angular range of the instrument, but varies in accordance with the cosine of the angle through which the coil 38 rotates. Thus the counter-torque produced by the second element 35 is $T_c = k_8 I_{(avg)} \cos \rho$, where $I_{(avg)}$ is the average value of the current flowing in the meter coil. This current is proportional to the voltage applied to the coil 38 so that the torque may be expressed as $$T_c = k_9 E_{(avg)} \cos \rho \tag{7}$$

where $E_{(avg)}$ is the average value of the voltage rectified by the rectifier 42 and $\rho$ is the angle of rotation of the meter. Equation 7 may be stated in terms of the effective or R. M. S. voltage applied to the load or $$T_c = k_{10} E \cos \rho \qquad (8)$$

Again for equilibrium conditions, $T_c = T_m$. Equating (4) and (8) gives $k_{10} E \cos \rho = k_4 E \cos \theta$, or $$\rho = k_{11} \theta \qquad (9)$$

From Equation 9 it may be observed that the angular deflection of the meter is directly proportional to the phase angle between the electrical quantities being investigated so that the angle of phase displacement may be read directly on a uniform scale or, if desired, a non-uniform scale may be provided to indicate the power-factor of the circuit. This equation shows that the instrument in Fig. 3 is independent of voltage fluctuations.

In accordance with the provisions of the patent statutes, I have described the principle of operation of my invention together with the apparatus which I now consider to be the best embodiment thereof, but I desire it to be understood that the apparatus shown is only illustrative and that the invention may be carried out by other means. For example, my arrangement is not limited to the use of a vibrating relay for deenergizing the electric meter during a portion of the cycle but includes any equivalent arrangement which will operate in synchronism with the current impulses to deenergize the meter at the desired time. As indicated previously, my invention also contemplates arrangements wherein the meter terminals are short-circuited instead of opening the meter circuit.

What I claim as new and desire to secure by Letters Patent of the United States, is:

1. In a device for measuring and indicating the power-factor of a constant voltage alternating current circuit, a meter, and means including an electroresponsive device operative periodically in synchronism with the current in said circuit for operatively connecting the meter to the voltage of said circuit only during half-cycles of the current which are of one polarity.

2. An in phase voltage measuring device, an alternating current circuit, a meter adapted to be supplied with current proportional to the voltage of said circuit, and an electroresponsive device responsive to the reversals of the current flowing in said circuit for causing the voltage supplied to said meter to be proportional also to the component thereof which is in phase with the current of said circuit.

3. In an in phase voltage measuring device, an alternating current circuit, a meter adapted to be supplied with current proportional to the voltage of said circuit, and an electromagnetic vibrator having electrical contacts adapted to vibrate periodically in synchronism with the current in said circuit for opening the meter circuit when the current is of one polarity and closing the meter circuit when the current is of the opposite polarity.

4. In an instrument responsive to the phase displacement between two alternating current quantities, in combination a shaft adapted for rotation, means for producing a radial magnetic field of constant strength including spaced pole pieces having arcuate faces, an electric coil mounted on said shaft for rotation between said pole faces, means for operatively connecting said coil to a first alternating current quantity during constant polarity half-cycle portions of each cycle of a second alternating current quantity, and means including a rectifier connected to said first alternating current quantity for deriving a uni-directional voltage proportional to said first alternating current quantity and for producing a counter-torque on said shaft proportional to the product of the average value of said uni-directional voltage times the cosine of the angle of rotation of said shaft, whereby the reading of said instrument is made independent of variations in the magnitude of said first alternating current quantity.

5. In an instrument responsive to the phase displacement between two alternating current quantities, in combination a shaft adapted for rotation, means for producing a radial magnetic field of constant strength including spaced pole pieces having arcuate faces, an electric coil mounted on said shaft for rotation between said pole faces, means for operatively connecting said coil to a first alternating current quantity during like polarity half-cycle portions of each cycle of a second alternating current quantity, means for producing a rectilinear magnetic field of constant strength including spaced pole pieces having plane faces, a second electric coil mounted on said shaft for rotation between said plane-faced pole pieces, and means including a rectifier for connecting said second coil to said first electrical quantity, whereby the reading of said instrument is made independent of variations in the magnitude of said first alternating current quantity.

6. In combination with an alternating current circuit, apparatus responsive to the component of the voltage of said circuit which is in phase with the current thereof comprising an electrical measuring instrument, connections for energizing said instrument in response to the voltage of said circuit, circuit opening and closing means associated with said connections, and means responsive to the reversals of the current flowing in said circuit for operating said circuit opening and closing means to energize said instrument only when the current flowing in said circuit is of a given polarity.

7. In combination with an alternating current circuit, an electrical measuring instrument, connections for energizing said instrument in response to the voltage of said circuit, circuit opening and closing means associated with said connections, means responsive to the reversals of the current flowing in said circuit for operating said circuit opening and closing means to energize said instrument only when the current flowing in the circuit is of a given polarity, said instrument to have a torque proportional to the component of voltage in phase with the current, and means energized in response to the voltage of said circuit for producing a counter torque on said instrument of such character as to cause its deflection to be independent of changes in voltage and proportional to power factor.

RICHARD MODLINGER.